United States Patent
Hamperl et al.

(10) Patent No.: US 8,594,884 B2
(45) Date of Patent: Nov. 26, 2013

(54) PROCESS AND DEVICE FOR PLAYING BACK MULTIMEDIA DATA IN A MOTOR VEHICLE

(75) Inventors: Helmut Hamperl, Cham (DE); Andreas Lindenthal, München (DE)

(73) Assignee: Siemens Aktiengesellschaft, Munich (DE)

( * ) Notice: Subject to any disclaimer, the term of this patent is extended or adjusted under 35 U.S.C. 154(b) by 1460 days.

(21) Appl. No.: 11/665,941

(22) PCT Filed: Sep. 26, 2005

(86) PCT No.: PCT/EP2005/054805
§ 371 (c)(1),
(2), (4) Date: Apr. 20, 2007

(87) PCT Pub. No.: WO2006/045679
PCT Pub. Date: May 4, 2006

(65) Prior Publication Data
US 2009/0059100 A1    Mar. 5, 2009

(30) Foreign Application Priority Data
Oct. 22, 2004    (DE) .......................... 10 2004 051 599

(51) Int. Cl.
*H04N 5/64*        (2006.01)
*G05D 1/00*        (2006.01)
*G06F 7/00*        (2006.01)

(52) U.S. Cl.
USPC .................................. 701/36; 348/837; 701/1

(58) Field of Classification Search
USPC .................................. 701/1, 36; 348/836–843
See application file for complete search history.

(56) References Cited

U.S. PATENT DOCUMENTS

| 6,483,428 | B1 | 11/2002 | Fish et al. |
| 6,941,149 | B2 | 9/2005 | Smith et al. |

(Continued)

FOREIGN PATENT DOCUMENTS

| DE | 198 53 665 | 5/2000 |
| DE | 100 60 599 | 6/2002 |

(Continued)

OTHER PUBLICATIONS

English Machine Translation of JP2004007423A. Translation May 7, 2011.*

(Continued)

*Primary Examiner* — Ryan Kwiecinski
(74) *Attorney, Agent, or Firm* — Cozen O'Connor

(57) ABSTRACT

A process and device are disclosed for playing back multimedia data in a motor vehicle. A digital multiplexed audio-video data stream from a multimedia data carrier, in particular a DVD, is read and separated into an audio data stream, a video data stream and a menu data stream. The audio data stream is converted into an audio signal which can be acoustically output and is output by an acoustic output unit. The video data stream and the menu data stream are combined into a digital graphic data stream which is blanked out when the motor vehicle is in movement. The graphic data stream is converted into a graphic signal which can be graphically output and is output by a graphic output unit. This ensures that the menu data are displayed even when the vehicle is in movement, so that the multimedia data carrier remains constantly useable.

8 Claims, 2 Drawing Sheets

(56) References Cited

U.S. PATENT DOCUMENTS

| | | | |
|---|---|---|---|
| 6,941,194 B1* | 9/2005 | Dauner et al. | 701/1 |
| 8,160,772 B2* | 4/2012 | Ito et al. | 701/36 |
| 2003/0216846 A1* | 11/2003 | Chang | 701/36 |
| 2004/0049324 A1* | 3/2004 | Walker | 701/1 |
| 2004/0234242 A1* | 11/2004 | Akita et al. | 386/95 |
| 2004/0249534 A1* | 12/2004 | Yamada et al. | 701/36 |
| 2005/0036757 A1 | 2/2005 | Romanowski et al. | |
| 2005/0278080 A1* | 12/2005 | Pilgrim et al. | 701/1 |
| 2009/0059100 A1* | 3/2009 | Hamperl et al. | 348/837 |

FOREIGN PATENT DOCUMENTS

| | | |
|---|---|---|
| DE | 101 46 036 | 4/2003 |
| JP | 2004-007423 | 1/2004 |
| JP | 2004007423 A * | 1/2004 |

OTHER PUBLICATIONS

International Search Report dated Jun. 30, 2006 issued in corresponding application No. PCT/EP2005/054805.

Written Opinion dated Sep. 26, 2005 issued in corresponding application No. PCT/EP2005/054805.

German Office Action dated Oct. 18, 2005 issued in corresponding application No. 10 2004 051 599.5.

* cited by examiner

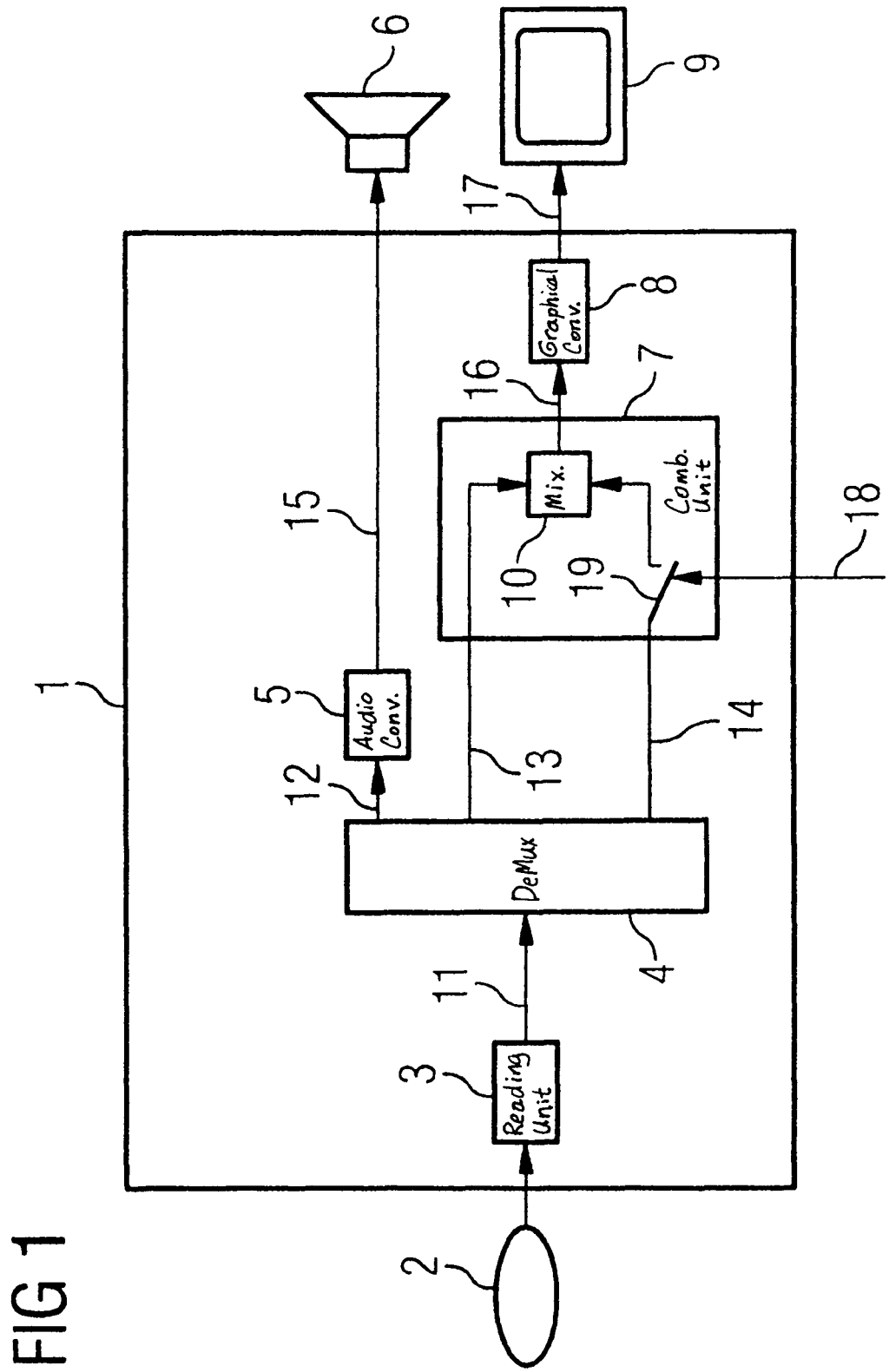

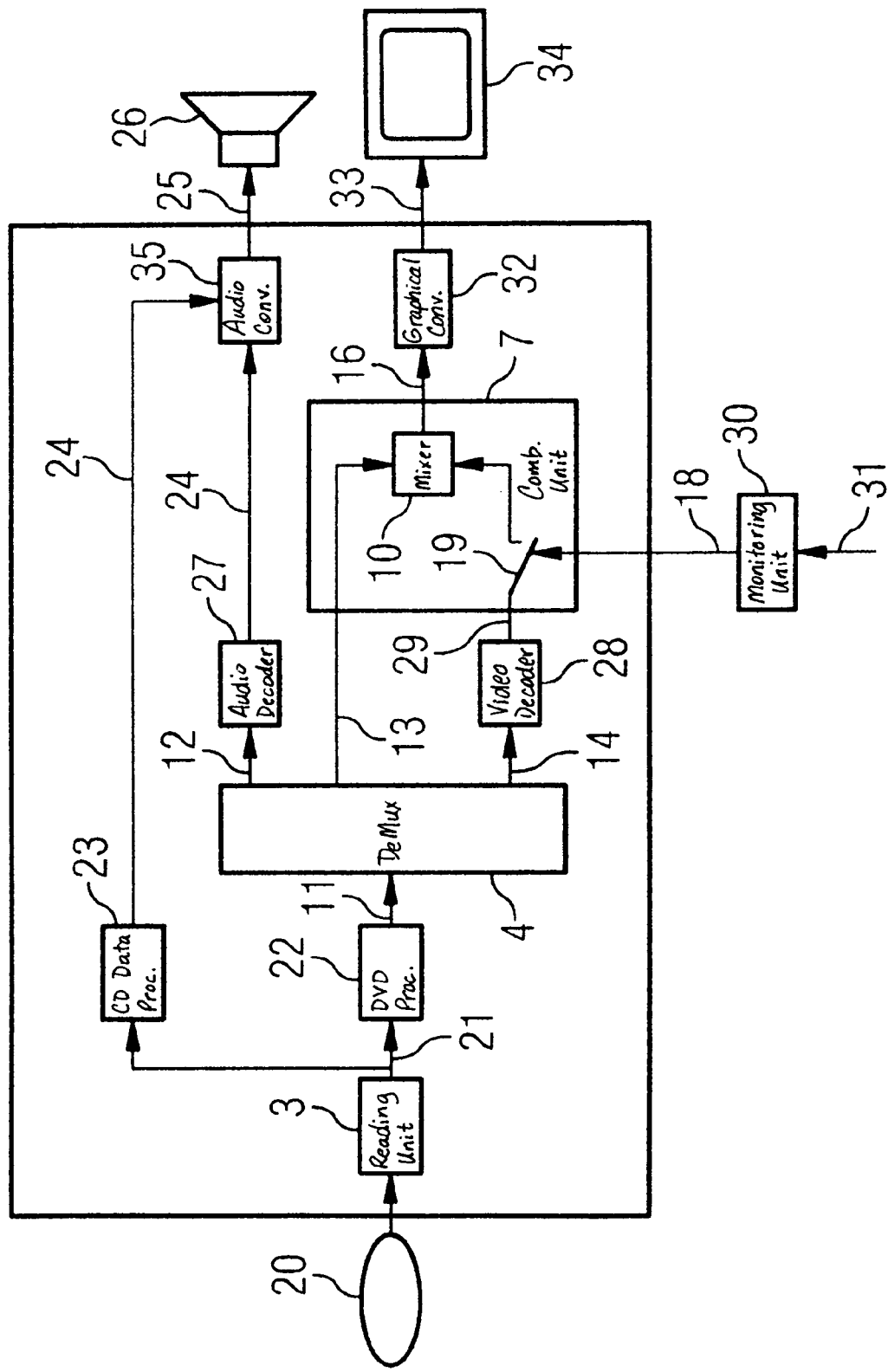

PROCESS AND DEVICE FOR PLAYING BACK MULTIMEDIA DATA IN A MOTOR VEHICLE

CROSS REFERENCE TO RELATED APPLICATIONS

This is a U.S. national stage of application No. PCT/EP2005/054805, filed on 26 Sep. 2005, which claims priority to the following application: DE 10 2004 051 599.9, filed 22 Oct. 2004, the content of which is incorporated here by reference.

BACKGROUND OF THE INVENTION

1. Field of the Invention

The invention relates to an apparatus and a method for reproducing multimedia data in a motor vehicle.

2. Description of Prior Art

Today, the reproduction of multimedia data is in ever more widespread use in motor vehicles. By way of example, U.S. Pat. No. 6,941,194 discloses a vehicle communication system in which a plurality of different data sources and a plurality of different operator terminals are connected to a computation unit, the data sources including, inter alia, a reproduction appliance for DVDs and CDs and also a tuner for receiving television signals. A central system controller awards the operator terminals individual and different access rights to the data sources and their associated applications. For the vehicle driver's operator terminal, this means, inter alia, that he can be refused an access right to a television receiver completely or just while driving.

This complies with the legal regulations stipulating that, for safety reasons, no moving pictures are permitted to be shown in a traveling vehicle. In Germany, a vehicle is currently deemed to be in a traveling state when it is moving at a speed of 6 km/h or greater. The traveling state of a vehicle is subsequently referred to as the driving state, and the opposite of this, that is to say when the vehicle is moving at a speed below a limit speed or is stationary, is referred to as the non-driving state.

DVDs which are known today as data storage media for multimedia data store digital audio and video data together, the audio data and the video data respectively comprising a plurality of data streams. For storage on a DVD, the audio data streams and video data streams, which are originally separate, are multiplexed together. When the DVD is played back, a single multiplexed audio-video data stream is therefore read from the DVD, and during further processing this single multiplexed audio-video data stream is broken down into the audio and video components again and is supplied to the respective audio and graphical output units.

Today, the video data stored on the DVD usually include the actual video picture data, that is to say the moving pictures, and also menu data. Menu data are understood to mean the digital representation of a user interface, and the user interface can have not only an operator control structure embedded in it but also, inter alia, one or more tables of contents for the films, music tracks or videos which the DVD contains and also various setting and selection options relating to reproduction options.

In today's multimedia reproduction appliances in motor vehicles, graphical output of any video data is prevented above a limit speed in order to comply with the legal regulations. In addition to non-display of the moving video pictures, this also results in display of the DVD's user interface being suppressed. If the data stored on the DVD are music tracks in conjunction with music videos, inter alia, then the suppression of the user interface means that it is also no longer possible to select a desired music track from a content directory, even though it is permissible to operate audio reproduction appliances in the traveling vehicle. The audio data from the DVD can now be reproduced only in the stored order.

SUMMARY OF THE INVENTION

It is an object of the present invention to specify an apparatus and a method for reproducing multimedia data in a motor vehicle which allow operator control of a multimedia reproduction appliance even in a traveling vehicle.

An inventive apparatus for reproducing multimedia data in a motor vehicle contains a reading unit for reading in a digital multiplexed audio-video data stream from a multimedia data storage medium, where the audio-video data stream contains audio data, video picture data and menu data, a demultiplex unit, connected to the reading unit, for producing a respectively separate audio data stream, video picture data stream and menu data stream from the audio-video data stream, an audio conversion unit, connected to the demultiplex unit, for converting the audio data stream into an audibly outputtable audio signal, a combining unit, connected to the demultiplex unit, for combining the video picture data stream and the menu data stream to form a digital graphics data stream, where the combining unit fades out the video picture data stream when the motor vehicle is in the driving state, a graphical conversion unit, connected to the combining unit, for converting the graphics data stream into a graphically outputtable graphics signal, an audio output unit, connected to the audio conversion unit, for outputting the audio signal, and a graphical output unit, connected to the graphical conversion unit, for outputting the graphics signal.

An inventive method for reproducing multimedia data in a motor vehicle includes the following steps: a digital multiplexed audio-video data stream is read in from a multimedia data storage medium, where the audio-video data stream contains audio data, video picture data and menu data; the audio-video data stream is demultiplexed in order to produce a respectively separate audio data stream, video picture data stream and menu data stream; the audio data stream is converted into an audibly outputtable audio signal; the video picture data stream and the menu data stream are combined to form a digital graphics data stream, where the video picture data stream is faded out when the motor vehicle is found to be in the driving state; the graphics data stream is converted into a graphically outputtable graphics signal; the audio signal is output on an audio output unit and the graphics signal is output on a graphical output unit.

An essential part of the invention is the consideration that the entire graphics data stream, comprising the combined video picture data stream and menu data stream, is no longer suppressed when the motor vehicle is in the driving state, but rather only the video picture data stream obtained from the demultiplex unit is faded out when required. This allows the menu data to be displayed unchanged and to be used for operator control of the audio component of the multimedia data storage medium. A vehicle driver is therefore provided with the operating convenience of the multimedia data storage medium at any time, regardless of whether or not moving pictures currently need to be suppressed.

Preferably, the combining unit fades in the video picture data stream again when the motor vehicle is in the non-driving state. It therefore automatically becomes possible to view moving pictures again as soon as the vehicle is no longer traveling, without the need for the operator of the multimedia reproduction appliance to perform certain input operations.

In another preferred embodiment, the menu data stream contains the data from a graphical user interface. In contrast to the tables of contents which are known from conventional CDs and which are in the form of navigatable lists, a user interface allows a significant improvement in operating convenience. By way of example, the audio data and video data can be identified differently and can be provided with additional information.

In this context, it is advantageous if the user interface allows navigation through and selection of audio data held on the multimedia data storage medium. When a multimedia data storage medium containing music tracks and music videos is played back, the invention configured in this manner allows graphical output of one of the music videos at the same time as playback of the associated music track in the non-driving state of the vehicle and, in the driving state, allows the music video to be faded out while the vehicle driver retains the unrestricted ability to navigate between the music tracks and to select a music track directly. In addition, if the user interface is configured appropriately, he can set certain reproduction options or can display additional information relating to the music tracks.

In another refinement of the invention, the combining unit is connected to a monitoring unit which signals the driving state to the combining unit at the moment at which the motor vehicle exceeds a prescribed limit speed and which signals a non-driving state if the vehicle is below the prescribed limit speed.

Alternatively, the driving or non-driving state could also be found on the basis of other sensor information, such as on the basis of wheel speeds or position information or on the basis of moving pictures from an onboard camera. If the information about the driving state is also required by other systems within the vehicle then it can be provided on a vehicle data bus. In addition to an external unit, that is to say one that is not directly associated with the apparatus for reproducing multimedia data or with the combining unit, the combining unit itself can also detect the driving or non-driving state by itself evaluating the relevant sensor information.

In the stated embodiment of the monitoring unit, only instances of exceeding and falling below a single limit speed are found. Alternatively, two different limit values may also be stipulated in order to permit a hysteresis and to prevent constant fade-out and fade-in of the video pictures when driving slowly in the region of the single limit speed.

In another refinement, the fade-in of the video picture data stream in the non-driving state is designed to be able to be turned off. This is advantageous particularly in the case of stop and go or in the case of delivery vehicles, for example, when there is constant change between the driving state and the non-driving state.

In one specific refinement, the multimedia data storage medium is a DVD. However, the invention may also be applied to any other data storage media for multiplexed audio, video and menu data.

BRIEF DESCRIPTION OF THE DRAWINGS

The invention is explained in more detail below with reference to an exemplary embodiment and the drawing, in which:

FIG. 1 is a schematic diagram of an inventive apparatus for reproducing multimedia data; and FIG. 2 is a schematic diagram of an apparatus for playing back DVDs or CDs.

DETAILED DESCRIPTION OF THE PREFERRED EMBODIMENTS

FIG. 1 shows an apparatus 1 for reproducing multimedia data in a motor vehicle. A reading unit 3 reads in a digital multiplexed audio-video data stream 11 from a multimedia data storage medium 2 and outputs it to a demultiplex unit 4 which splits the audio-video data stream 11 into an audio data stream 12, a video picture data stream 14 and a menu data stream 13. The audio data stream 12 is converted by an audio conversion unit 5 into an audibly outputtable audio signal 15 which is output on the audio output unit 6. The video picture data stream 14 and the menu data stream 13 are supplied to a combining unit 7. In addition, the combining unit 7 receives a signal 18 about the driving or non-driving state of the motor vehicle, said signal 18 being read into the apparatus 1 from a data bus, for example a MOST bus. If the vehicle is in the non-driving state, a switch 19 is closed and the video picture data stream 14 is combined with the menu data stream 13 in a mixing unit 10 to form a digital graphics data stream 16. If, by contrast, the vehicle is in the driving state then the switch 19 opens and the output signal from the mixing unit 10, that is to say the graphics data stream 16, comprises only the menu data stream 13. The graphics data stream 16 is converted into a graphically outputtable graphics signal 17 in a graphical conversion unit 8 and is output on a graphical output unit 9.

FIG. 2 shows an apparatus for reproducing multimedia data from a CD or DVD. The CD or DVD, that is to say the data storage medium 20, is optically scanned by the reading unit 3, and the signals which have been read in are preamplified. Depending on the type of data storage medium, the data 21 which have been read in are supplied to a DVD data processor 22 or to a CD data processor 23, where they are accordingly demodulated and subjected to error removal. The output signal from the CD data processor 23 contains digital audio data in an audio data format 24, these being supplied to an audio conversion unit 35. In the case illustrated, the conversion unit 35 is a digital/analog converter for producing analog audio signals 25. The analog audio signals 25 are output on a loudspeaker 26. Alternatively, the conversion unit 35 may also be a digital audio interface for transforming the audio data stream into another digital audio data format, which can be output on an audio output unit, for example for actuating a Dolby Surround system.

The DVD data processor 22 outputs a multiplexed audio-video data stream 11 and forwards it to a demultiplex unit 4. The demultiplex unit 4 breaks down the audio-video data stream into an audio data stream 12, a menu data stream 13 and a video data stream 14. The audio data stream 12 is forwarded to an audio decoding unit 27 which converts the audio data stream 12 from an MPEG audio format or a Dolby Digital audio format, for example, into the audio data format 24. The audio conversion unit 35 is used to transform the audio data 24 into analog audio signals 25 which can be output on the loudspeaker 26. The video data stream 14 is decompressed in a video decoding unit 28, for example from an MPEG video format into another, digital video data format 29, and is routed to the combining unit 7, which has already been described. The combining unit 7 receives from a monitoring unit 30 the signal 18 about the driving or non-driving state, the monitoring unit 30 evaluating the speed signal 31 to determine whether it is above or below a limit speed of 6 km/h and outputting the driving state if it is above and the non-driving state if it is below. The graphics data stream 16 which is output from the mixing unit 10 is converted by means of a graphical conversion unit 32 into a digital graphics signal 33 for output on a graphics screen 34 and is displayed on the graphics screen 34.

What is claimed is:

1. An apparatus for reproducing multimedia data in a motor vehicle, comprising:
   a reading unit configured to read in a digital multiplexed audio-video data stream from a multimedia data storage medium, wherein the audio-video data stream includes audio data, video picture data and menu data;
   a demultiplex unit connected to said reading unit and configured to receive the audio-video data stream and produce an audio data stream, a video picture data stream, and a menu data stream therefrom;
   an audio conversion unit connected to said demultiplex unit and configured to convert the audio data stream into an audibly outputtable audio signal;
   a combining unit connected to said demultiplex unit configured to combine the video picture data stream and the menu data stream to form a digital graphics data stream, wherein said combining unit is further configured to receive a driving state signal indicating whether the vehicle is in a driving state and to fade out the video picture data stream from and maintain the menu data stream in the digital graphics data stream when the motor vehicle is in the driving state;
   a graphical conversion unit connected to said combining unit and configured to convert the digital graphics data stream into a graphically outputtable graphics signal;
   an audio output unit connected to said audio conversion unit and configured to output the audio signal; and
   a graphical output unit connected to said graphical conversion unit and configured to output the graphics signal, whereby the menu data stream is always output and displayed by the graphical output unit.

2. The apparatus of claim 1, wherein said combining unit is further configured to fade in the video picture data stream when the motor vehicle enters a non-driving state from the driving state.

3. The apparatus of claim 2, wherein the video picture data stream is selectively excluded from the digital graphics data stream independent of a status of the driving state signal.

4. The apparatus of claim 1, wherein the menu data stream includes data from a graphical user interface.

5. The apparatus of claim 1, wherein the graphical user interface is configured to permit navigation through and selection of audio data held on the multimedia data storage.

6. The apparatus of claim 1, further comprising a monitoring unit connected to said combining unit and configured to provide the driving state signal indicating that the vehicle is in a driving state when the motor vehicle exceeds a prescribed speed limit and indicating that the vehicle is in a non-driving state if the motor vehicle is below the prescribed speed limit.

7. The apparatus of claim 1, wherein the multimedia data storage medium comprises a DVD.

8. A method of reproducing multimedia data in a motor vehicle, comprising the steps of:
   reading a digital multiplexed audio-video data stream from a multimedia data storage medium, wherein the audio-video data stream includes audio data, video picture data and menu data;
   demultiplexing the audio-video data stream and produce an audio data stream, a video picture data stream, and a menu data stream therefrom;
   converting the audio data stream into an audibly outputtable audio signal;
   combining the video picture data stream and the menu data stream to form a digital graphics data stream, determining whether vehicle is in a driving state, and fading out the video picture data stream from and maintaining the menu data stream in the digital graphics data stream when the motor vehicle is determined to be in the driving state;
   converting the digital graphics data stream into a graphically outputtable graphics signal;
   outputting the audio signal on an audio output unit; and
   outputting the graphics signal on a graphical output unit, whereby the menu data stream is always output and displayed by the graphical output unit.

\* \* \* \* \*